May 24, 1966  L. R. WHITTINGTON  3,253,068
METHOD AND APPARATUS FOR PRODUCING
DECORATIVE HOLLOW PLAYBALLS
Filed June 14, 1963
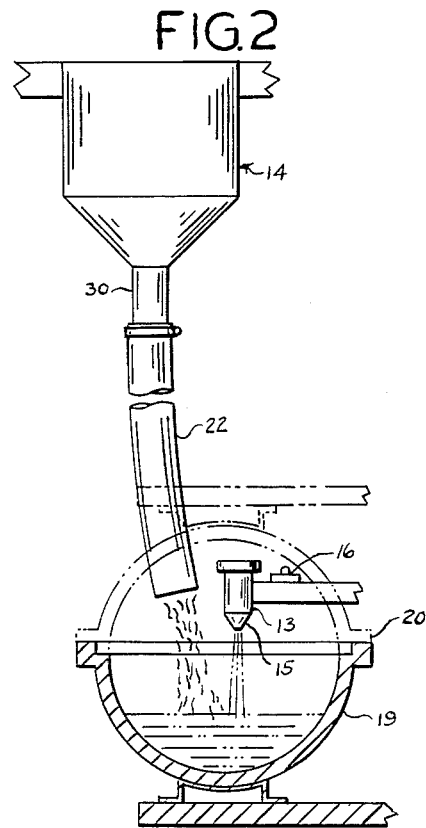
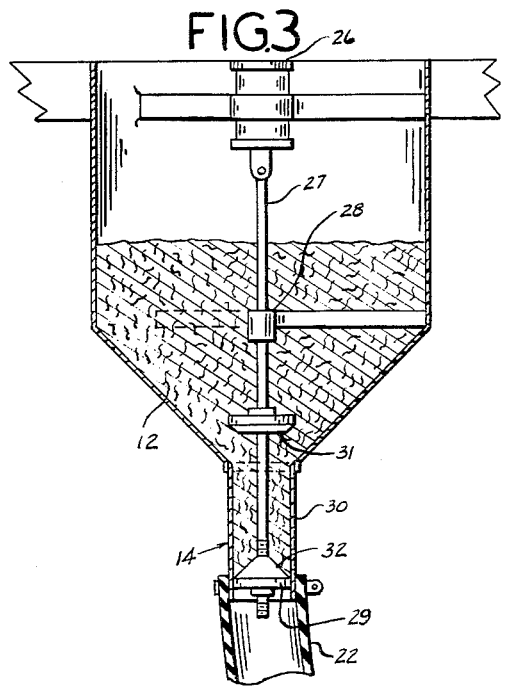
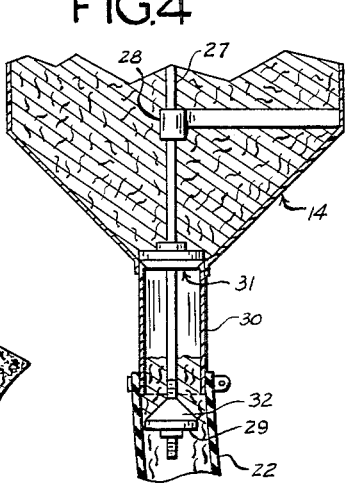
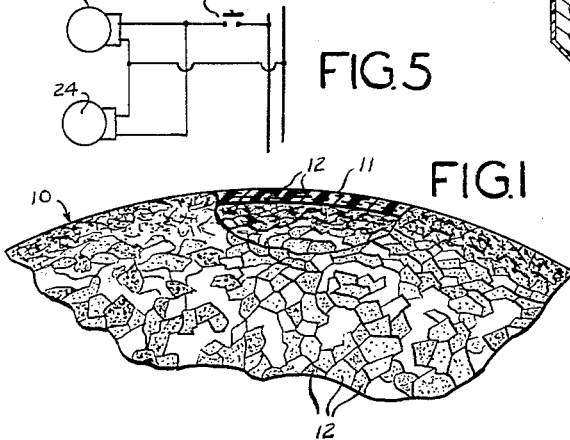
INVENTOR.
Lloyd R. Whittington
BY
William Cleland
Attorney 3,253,068
METHOD AND APPARATUS FOR PRODUCING
DECORATIVE HOLLOW PLAYBALLS
Lloyd R. Whittington, 402 Katherine Ave., Ashland, Ohio
Filed June 14, 1963, Ser. No. 287,913
3 Claims. (Cl. 264—73)

This invention relates to a method for producing decorative hollow articles of synthetic resin material, and in particular relates to a method and apparatus for producing playballs of polyvinyl chloride having colorful particles of material therein for decorative purposes.

In the past it has been the general practice in the trade, partly for decorative purposes and partly for economical reasons, to produce, when possible, polyvinyl chloride playballs having incorporated therein colorful chips made by cutting scrap articles of the same materials.

By one method used in the past, a measured charge of dry vinyl chips, usually ground scrap of one color, or of several colors mixed together, was placed in the bottom half of a playball mold. Then a measured amount of fluid plastisol of a different color was dispensed into said hold half with considerable velocity, thereby to blend or mix the plastisol with the vinyl chips to a somewhat limited extent. The mold was then closed and rotated in the presence of heat by the known rotational casting methods. Some further blending of the dry chips and fluid plastisol was possible during the early stages of mold rotation, but rapid heating of the mold quickly gelled the material so that after a few revolutions blending ceased, and the products were marked by non-uniform distribution of the chips. As an example, one half of the ball formed in the bottom mold section in which the chips were first deposited always contained a much greater number of chips than the other half of the ball. Some areas of a few square inches contained no chips at all. When attempts were made to correct this difficulty by depositing a second charge of chips on top of the plastisol charge, it was found that the time required for depositing the three separate charges in the mold was excessive and economically unsound, and that the operator could no longer keep apace with the normal machine cycle of operation.

In another known method a single charge of dry chips was placed on top of a measured charge of vinyl plastisol in the bottom half of a sectional mold, but this likewise resulted in non-uniform distribution of chips.

It was not practical to premix plastisol and chips because a resultant thickening of the mixture rendered the same incapable of being poured or otherwise freely dispensed into the mold in predetermined quantities.

One object of the present invention is to provide an improved method of making hollow polyvinyl chloride articles of the character described, by which decorative chips are uniformly distributed throughout the wall of the article, without added steps which would materially increase the production cost of the article.

Another object of the invention is to provide improved apparatus for the manufacture of hollow decorative articles of the character described, which is automatically operable to dispense plastic resin plastisol and resin chips into a rotational casting mold at simultaneously controlled rates of flow to attain uniform dispersion of the chips throughout the wall of the article.

Other objects of the invention will be manifest from the following brief description and the accompanying drawings.

Of the accompanying drawings:

FIGURE 1 is a fragmentary view of a vinyl playball, partly broken away and in cross-section, illustrating substantially uniform distribution of vinyl chips throughout the spherical wall of the ball.

FIGURE 2 is a front elevation, on a reduced scale and partly broken away and in section, of apparatus for simultaneously filling the lower half of a rotational casting mold with vinyl chips and vinyl plastisol, the upper half of the mold being in chain-dotted lines.

FIGURE 3 is a vertical cross-section, on a larger scale, of a vinyl chip dispensing unit shown at the upper portion of FIGURE 2, and illustrating valving means of the unit in a closed or non-operating condition.

FIGURE 4 is a sectional view illustrating the valving means of FIGURE 3 in an open or chip-dispensing condition.

FIG. 5 is a schematic wiring diagram for controlled operation of the filling apparatus shown in FIGURE 2.

Referring to FIGURE 1 of the drawings, there is illustrated a playball 10, made by the process of the invention, and wherein the background or basic material is transparent, translucent or opaque polyvinyl chloride, and which has integrally gelled and fused in the wall 11 of the same a multiplicity of uniformly dispersed, closely spaced vinyl chips 12, 12. The background material of wall 11 may be of any desired color and the chips may be of one color or a mixture of colors which contrast in varying degrees with the background material. Variations in colors of the chips 12 are represented in FIGURE 1 by varying shades of stippling.

Referring to FIGURES 2 and 3, the apparatus of practicing the method of the invention includes a movable plastisol dispensing unit 13, connected to a source of supply of plastisol, and an overhead chip-dispensing hopper 14.

The plastisol dispensing unit may be of known type including a nozzle 15, operable by momentary depression of a switch 16 on unit 13, to energize a single stroke plastisol metering pump 17, indicated diagrammatically in FIGURE 5. This dispenses a measured amount of liquid plastisol into the bottom half 19 of one cavity of a multiple cavity mold 20.

At the same time, upon said depression of switch 16, the chip-dispensing or metering hopper is used to dispense a pre-measured volume of dry vinyl chips 12 through a flexible, rubber-like tube 22 and into said mold half 19 (see FIGURE 2), and thereby to be substantially uniformly mixed with the plastisol while both materials are flowing freely.

To this end, a three-way solenoid valve 24 is operable to control pressure fluid to a piston cylinder 26 mounted at the upper end of unit 14, and thereby reciprocates a piston rod 27, which is vertically slidable in a fixed guide spider 28. A valving disc 29, adjustably threaded on the lower end of rod 27 is slidably received in the lower end of a chip-metering tube 30 at the bottom of the chip-dispensing unit, as shown in FIGURE 3.

When the disc 29 is thus moved to an open position spaced below the lower end of tube 30, as shown in FIGURE 4, a second valve disc 31 affixed on the piston rod 28 moves to seated position on the upper end of tube 30 to stop the flow of chips into the same. Accordingly, a predetermined quantity of chips metered and released from the tube will trickle down the flexible hose 23 at a controlled rate, which the operator may vary as required by manually adjusting the flexed condition of the hose, to merge the free flowing streams of chips and plastisol, as shown in FIGURE 2. After a predetermined time the valves 16 and 24 are automatically actuated to move the valve discs 29 and 31 to open and closed positions, respectively, as shown in FIGURE 3, in which the tube 30 is again filled with chips. The upper portion 32 of the valve disc 29 may be conical to guide the disc up into the tube, as well as to facilitate removal of the chips from the tube.

The length and diameter of the tube 22 are selected so that the time required for all of the vinyl chips to fall into the mold coincides with the time required for the plastisol to be dispensed. The amount of chips dispensed may be varied by threaded adjustment of valve disc 29 on the rod 27.

Nozzle 15 and flexible tube 22 may be suitably coupled together for the operator's convenience for rapidly filling multiple cavity molds.

In use of the apparatus described above to practice the method of the invention, the operator first manipulates the plastisol nozzle 13 and the lower end of tube 22 to be close to each other over the lower mold section 19. By closing switch 16 (FIGURES 2 and 5) there is concurrently metered and released directly into mold section 19, at predetermined rates, separate converging streams of free flowing polyvinyl chloride plastisol and dry polyvinyl chloride chips 12, as indicated in chain-dotted lines in FIGURE 2. The plastisol and chips are thereby thoroughly blended as they converge within or near the mold, and before the plastisol has an opportunity to be exposed to heat such as would start gelling of the plastisol and thereby retard such blending.

Next, the nozzle 13 and hose 22 are moved away and the mold is closed, as shown in chain-dotted lines in FIGURE 2, and rotated in known manner about a plurality of angularly disposed axes in the presence of external heat, first to gel and then to fuse the blended materials as a thin-walled ball on the article-forming surface portions of the mold.

After cooling the mold to requisite degree, the formed ball 10, with the chips integrally united in the wall 11 thereof, is removed from the mold and inflated to predetermined size in known manner.

The finished ball 10, as illustrated in FIGURE 1 and as produced by the method described above, will have the decorative chips 12, 12 manifestly uniformly distributed throughout the wall 11 thereof. That is, the uniform distribution of the chips is pleasingly visible to the eye of an ordinary observer.

The time saving importance of the present invention is illustrated by the fact that the operator can handle approximately twice as many mold cavities as would be handled by the prior method in which the plastisol and chips were separately charged within the same cycle time.

Modifications of the invention may be resorted to without departing from the spirit thereof or the scope of the appended claims.

What is claimed is:

1. A method of producing a playball or like hollow decorative synthetic resin article, comprising: the steps of concurrently introducing directly into one section of a sectional cavity mold, at simultaneously controlled rates of flow from separate supply sources, metered volumes of plastic resin plastisol fed under pressure and decorative particles in separate free-flowing streams thereof to progressive convergence of the streams toward union thereof in said one mold section as a body of flowable plastic resin with said particles substantially uniformly blended therein; and closing the mold by assembling the sections thereof, and rotating the assembled mold about a plurality of axes in the presence of heat to gel and fuse the body as a thin-walled article on the article-forming surfaces of the mold, with the particles manifestly uniformly distributed throughout the entire wall of the article.

2. A method as set forth in claim 1, wherein said resin plastisol is polyvinyl chloride and said resin particles are polyvinyl chloride chips of contrasting coloring with respect thereto.

3. Apparatus for rotationally casting a hollow synthetic resin article in a sectional cavity mold to have decorative chips distributed throughout the wall of the article, comprising: a hopper for containing a supply of said chips; said hopper having chip-metering means, fluid dispensing means for pumping a predetermined volume of fluid resin plastisol from a source thereof; and control means for concurrently operating said chip-metering means and said fluid dispensing means simultaneously to converge free-flowing streams of chips and plastisol progressively to form a unitary body thereof of predetermined volume in one section of the mold, in which the chips are uniformly blended throughout the plastisol; whereby upon assembling the mold sections and applying rotational casting motion to assembled mold in the presence of heat, a thin-walled article is formable in the mold from the blended mixture to have the chips manifestly uniformly dispersed throughout all portions of the wall of the article.

References Cited by the Examiner
UNITED STATES PATENTS

| | | | |
|---|---|---|---|
| 2,874,964 | 2/1959 | Edwards | 264—73 |
| 3,079,644 | 3/1963 | Molitor et al. | 264—310 |

ALEXANDER H. BRODMERKEL, *Primary Examiner.*

J. R. DUNCAN, B. SNYDER, *Assistant Examiners.*